March 18, 1924.

A. BREZOVITZ ET AL 1,487,200

AUTOMATIC DUMP CAR

Filed March 17, 1919    6 Sheets-Sheet 2

Witness:
Harry S. Gaither

Inventors:
Anton Brezovitz and
Abraham L. Herr
by Sheridan, Jones, Sheridan & Smith
Attys

March 18, 1924.

A. BREZOVITZ ET AL

AUTOMATIC DUMP CAR

Filed March 17, 1919   6 Sheets-Sheet 3

Patented Mar. 18, 1924.

1,487,200

UNITED STATES PATENT OFFICE.

ANTON BREZOVITZ AND ABRAHAM L. HERR, OF SOUTH BEND, INDIANA.

AUTOMATIC DUMP CAR.

Application filed March 17, 1919. Serial No. 283,243.

*To all whom it may concern:*

Be it known that we, ANTON BREZOVITZ, a citizen of Hungary, residing at South Bend, in the county of St. Joseph and State of Indiana, and ABRAHAM L. HERR, a citizen of the United States, residing at South Bend, in the county of St. Joseph and State of Indiana, have invented certain new and useful Improvements in Automatic Dump Cars, of which the following is a specification.

This invention relates to an improvement in dump car bodies and to means for actuating the same. The principal object of the invention is to provide an improved side dumping body for automobile trucks and the like. An important feature of the invention is the provision of a body which is moved laterally in a horizontal direction and then tilted upwardly to dump the contents thereof. A further important object is to provide means for dumping the car body in combination with means for automatically lowering the side door or wall of the body when the car is dumped, and for raising said door when the body is returned to its normal horizontal position. Still another object is to provide improved actuating mechanism for moving the car body to and from its dumping position. Another feature of the invention is the provision of means for locking the body in position on the car. Other objects relate to various features of construction and arrangement which will appear more fully hereinafter.

The nature of the invention will be understood from the following specification, taken with the accompanying drawings, in which one embodiment is illustrated.

The general nature of the invention is best illustrated by reference to Fig. 1, where our improved dumping body 15 is shown in dumping position and supported by the frame 16 of an automobile truck, designated generally by the numeral 17. As indicated in the drawings, the truck body moves laterally with respect to the truck frame and is tilted upwardly to dump the contents thereof at the side of the truck over one of the side doors which is lowered into alinement with the floor of the body when the latter is in its inclined position. The invention is capable of application to substantially any form of truck or car, and the particular vehicle herein shown is intended only for illustrating the application of the invention thereto.

The truck frame 16 carries an auxiliary frame comprising longitudinally extending frame members 18 of channel form, which are seated on the longitudinal frame members 16ª of the truck frame and secured thereto by means of the cleats or brackets 19. The longitudinal members 18 carry a plurality of transverse supporting members 20 of channel form which are arranged in pairs spaced apart. Three pairs of these transverse supporting members are embodied in the form of truck illustrated and are secured to the longitudinal frame members 18 by means of rivets and brackets 21.

Figure 1:
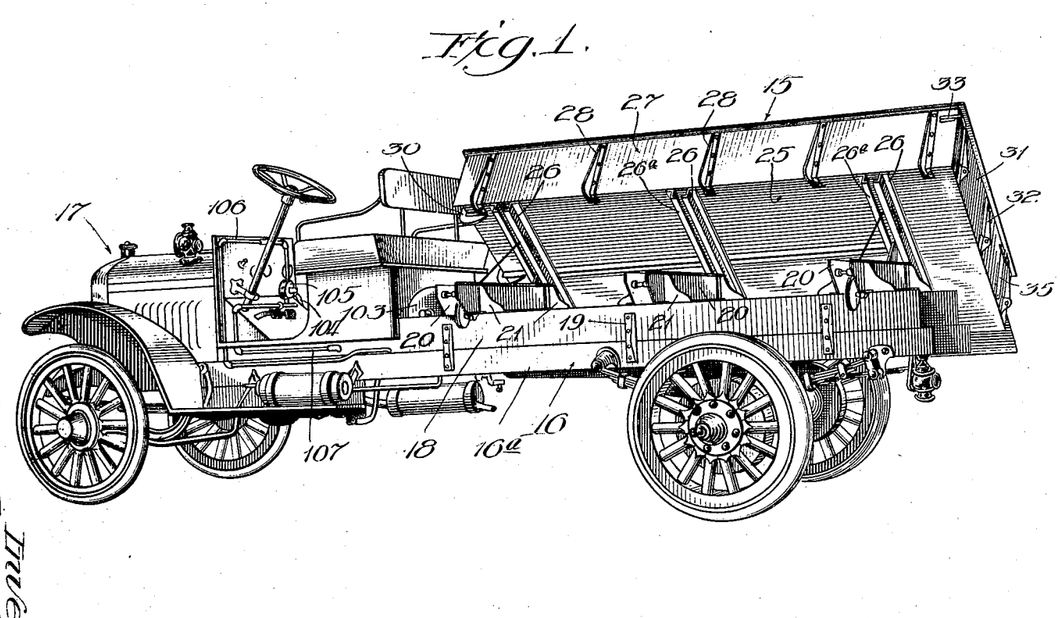
Figure 1 is a perspective view of a automobile truck showing our improved body in dumping position.

The truck body 15 has a floor 25 formed preferably of sheet metal and supported by the transverse track members 26, which are of Z-bar form, having upper flanges riveted to the floor 25, and having lower flanges which are directed inwardly towards each other, these track members 26 being arranged in pairs, as shown in Fig. 1, each pair of bars 26 being adapted to occupy a position between the pairs of transverse supporting members 20, previously described. The truck body further comprises one stationary side wall 27, which is secured to the bottom thereof by means of brackets 28, a front end wall 29 secured to the floor portion of the body by brackets 30, and a rear wall 31 which is secured to the floor of the body by hinges 32. This rear wall is capable of being lowered and is normally held in its upright position by means of the ears 33 connected to one edge of the rear wall and the stationary side wall 27, these ears being engaged by a pin 34. The rear wall is further provided adjacent the other end thereof with a locking bar 35, which is normally held in its upright locking position by a movable pivoted clip or latch 35$^a$. The side wall 36 of the car body is hinged to the floor 25 by means of the hinges 37, and this movable wall is raised and lowered simultaneously with the raising and lowering of the car body by mechanism hereinafter described.

Figure 11:
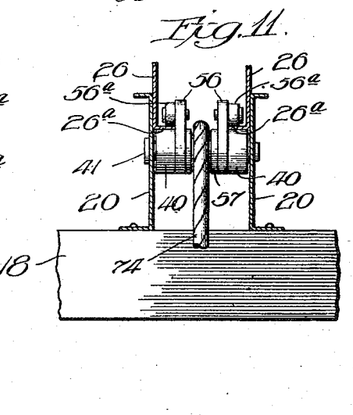
Fig. 11 shows a sectional view on the line 11—11 of Fig. 10.

The track members 26 secured to the underside of the car body are adapted to travel on rollers 40, which are mounted between the supporting members 20 of the auxiliary frame. These rollers are mounted on pins 41 extending through the members 20, and are of the form illustrated particularly in Figs. 5 and 11. It will be seen that each roller is reduced in diameter between its ends and is provided with enlarged extremities adapted to coact with the lower horizontal flanges 26$^a$ of the track members 26. These rollers are adapted to reduce the friction upon the track members when the car body is moved to or from its dumping position. In the embodiment illustrated three of these rollers are mounted between each pair of frame members 20.

Figure 4:
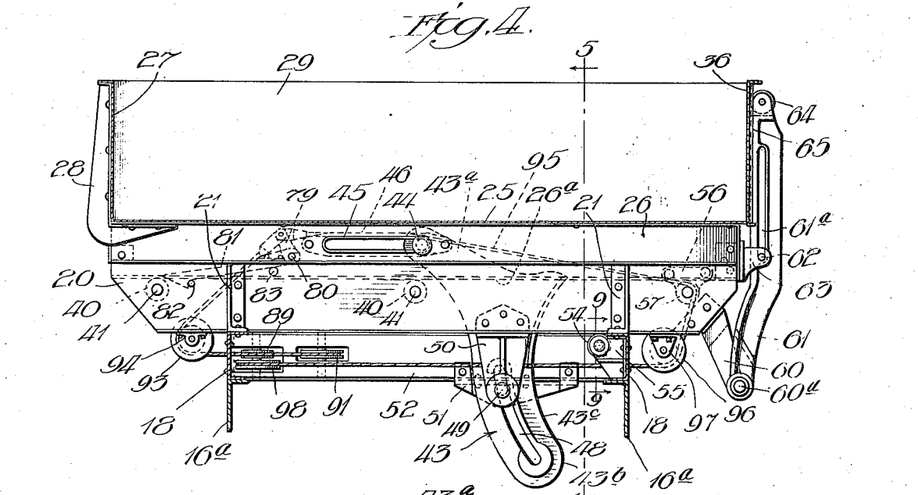
Fig. 4 shows a transverse section on the line 4—4 of Fig. 8, illustrating the mechanism for dumping the car body.
Figure 5:
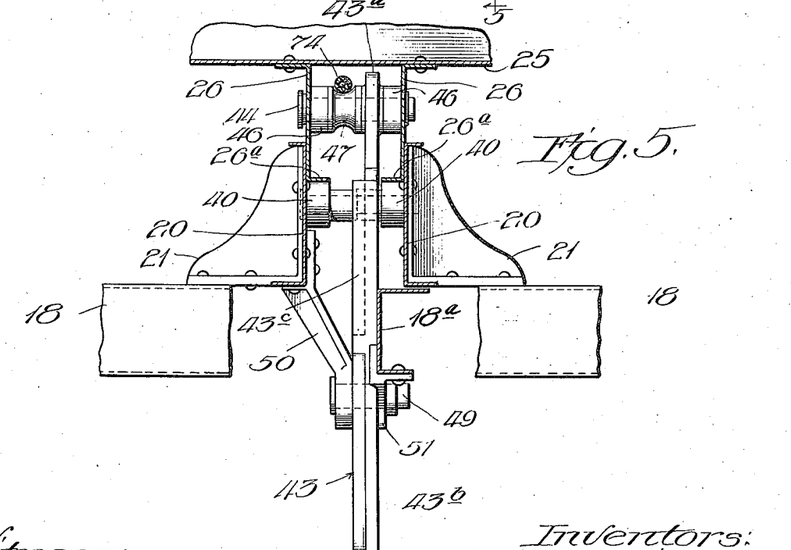
Fig. 5 is a detailed sectional view on the line 5—5 of Fig. 4.
Figures 6, 7:
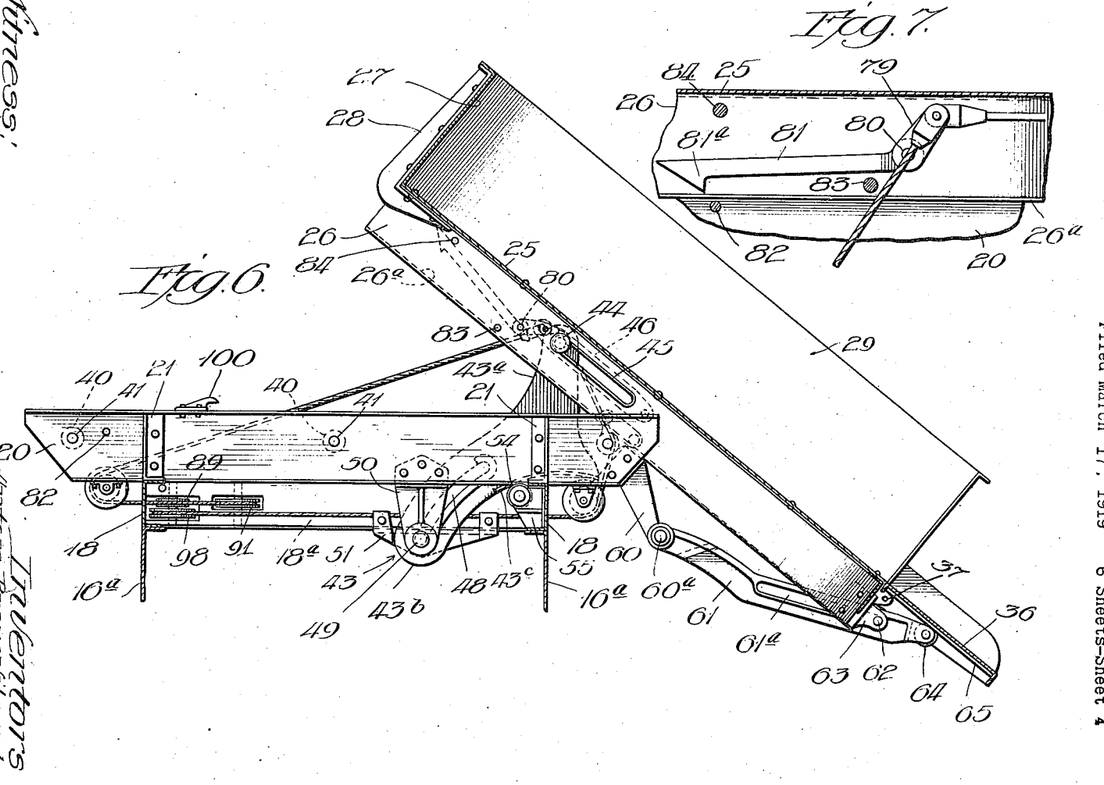
Fig. 6 is a sectional view similar to Fig. 4, showing the car body in dumping position.
Fig. 7 shows an enlarged side elevation of the locking mechanism for holding the body on the frame.

The lateral movement of the car body is controlled by a series of arms 43, having the form illustrated particularly in Figs. 4 and 6. One of these arms is mounted between each of the front and rear pairs of supporting members 20, and each arm comprises an upwardly extending portion 43$^a$, which is engaged adjacent its extremity by a pin 44, the ends of which are adapted to engage longitudinal slots 45 in the track members 26. Each slot is reinforced by slotted spacing members 46 secured to the members 26, and a roller 47 located between the members 46 is adapted to coact with one of the cables hereinafter described. When the car body is in its normal horizontal position, each pin 44 is adapted to occupy a position at the extreme right end of the slots 45, as illustrated in Fig. 4, and when the car body is in its dumping position, the pins 44 are adapted to occupy a position at the extreme left of the slots 45, as illustrated in Fig. 6. Each controlling arm 43 is further provided with a depending curved portion 43$^b$ provided with the curved slot 48 adapted to be engaged by a pin 49 extending between the brackets 50 and 51, which are secured to the frame members 20 and to an auxiliary transverse frame member 18$^a$, respectively, as illustrated in Figs. 4 and 5. Each pin 49 serves to guide its controlling arm 43 when the latter moves in response to the movement of the car body.

Upon movement of the body 15 to the right, as viewed in Fig. 4, each of the arms 43 remains stationary until the pins 44 engage the left hand ends of the slots 45. Further movement of the body 15 toward dumping position tilts the member 43 about the pin 49 until the curved lateral edge 43$^c$ of the arm engages one of the rollers 54 carried by brackets 55 attached to the side frame members 18. Each arm 43 then moves bodily with the body of the car, with the curved surfaces 43$^c$ travelling on the rollers 54, and this movement continues until the pins 49 engage the lower ends of the slots 48, as shown in Fig. 6, where the body 15 is in its dumping position. It will be seen that as the arms 43 travel upwardly and outwardly over the rollers 54, the body 15 is tilted after having been moved horizontally until a considerable portion thereof projects beyond the lateral edge of the truck frame.

Figure 10:
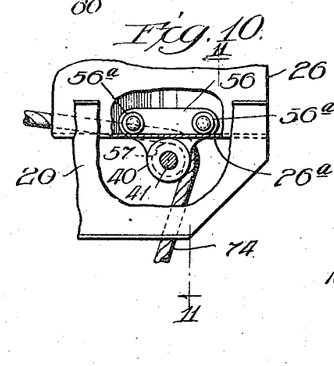
Fig. 10 is a detailed side elevation of the device for preventing upward movement of the car body with respect to the frame at the side thereof on which the dumping takes place.

In order to prevent upward movement of the body 15 with respect to the truck frame at the right hand side of the truck, as viewed in Figs. 4 and 6, holding devices 56 are provided between each pair of transverse supporting members 20. These holding devices are in the form of plates, as illustrated in Fig. 10, and pivoted on the pin 41 between the rollers 40 upon which the track members 26 travel. A pulley 57 is mounted between the plates 55, and the plates carry small rollers 56$^a$ which overlap and engage the upper sides of the inwardly extending flanges 26$^a$ of the members 26, so that these track members are held downwardly on the rollers 40. When the truck body reaches its dumping position, the holding devices 56 tilt with the body of the truck about the pivot pins 41, as illustrated in Fig. 6.

When the body 15 is moved to dumping position, the side door or wall 36 is automatically lowered by mechanism comprising a series of supporting brackets 60, which are located between and secured to the ends of the transverse supporting beams 20. A series of door operating levers 61 are pivoted to the bracket 60 by pins 60$^a$, and these levers are provided with slots 61$^a$ adapted to be engaged by pins 62 carried by brackets 63 secured to the ends of the track members 26 carried by the truck body. The upper and outer ends of the slotted lever 61 are provided with rollers 64, which are adapted to coact with vertically extending tracks or wear plates 65 secured to the side wall 36. When the car body is in its normal position, as shown in Fig. 4, the pins 62 occupy positions at the lower ends of the slots 61$^a$. Upon movement of the car body to dumping position, the brackets 60 remain stationary with respect to the truck body, while the levers 61 are pushed outwardly by the coaction of the pins 62 with the slots in the levers, thus allowing the side wall 36 to fall by gravity as the rollers 64 travel downwardly and inwardly on the plates 65. When the final dumping position is reached, as illustrated in Fig. 6, the pins 62 occupy positions at the upper and outer ends of the slots 61$^a$, which determine the limiting position of the door 36, which should then be preferably in alinement with the floor 25 of the body. When the car body is returned to its normal horizontal position by mechanism hereinafter described, the pins 62 automatically elevate the slotted lever 61, and thereby return the side door 36 to its closed position. The upward movement of the side doors is limited by its coaction with the end walls 29 and 31.

Figure 2:
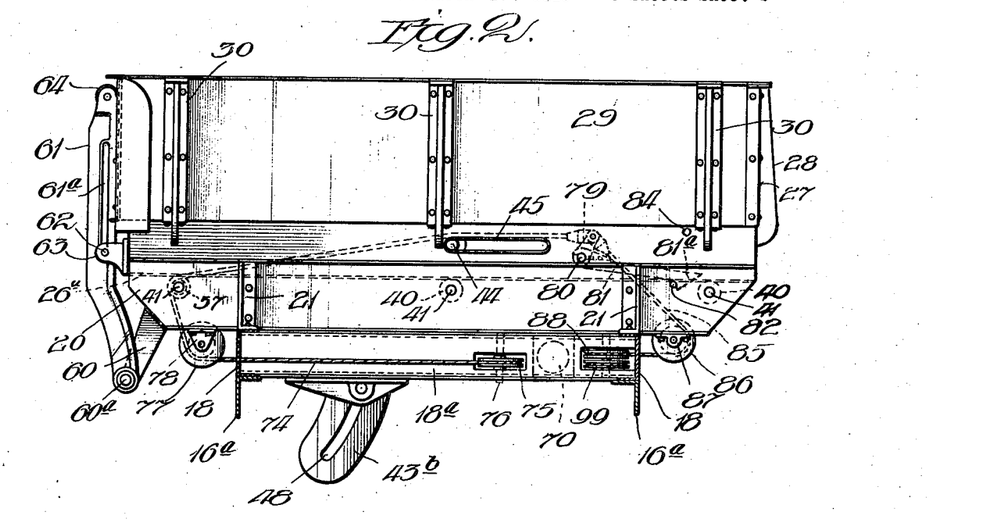
Fig. 2 is a front elevation of the truck body showing the truck frame in transverse section.

The movement of the car body in the embodiment of the invention herein illustrated is effected by fluid pressure through the operation of a series of cables connected to the underside of the car body. This mechanism is operated by a compressed air cylinder 70, having a piston rod 71, which actuates the cross-head 72 mounted to travel on parallel guide rods 73, supported by the frame members 20. From one side of the cross-head 72, a cable 74 extends toward the forward end of the car and is carried around a pulley wheel 75 mounted in a slot in the transverse frame members 18$^a$ at the forward end of the auxiliary truck frame and adapted to rotate on a pin 76. After being carried around the pulley 75, the cable 74 is extended laterally toward the dumping side of the body, and thence upwardly around a pulley 77 carried by a bracket 78 secured to the undersides of the frame members 20. The cable 74 extends upwardly around one of the pulleys 57 mounted on a pin 41, extending between the members 20, as shown in Figs. 2 and 10, leading from the pulley 57 toward the opposite side of the truck body between the track members 26 and over one of the rollers 47 mounted on a pin 44, carried at the upper end of one of the controlling arms 43, as shown in Figs. 2 and 5. After extending over the pulley 47, the cable 74 is connected to a crank arm or lever arm 79, mounted on a pin 80 carried between the transverse track members 26 at the forward end of the truck body. This crank arm 79 operates a locking lever 81, having a hooked extremity 81$^a$ adapted to engage a pin 82 secured between the frame members 20 adjacent the side of the truck frame. The downward movement of the crank 81 is limited by a pin 83, while the upward movement thereof is limited by a pin 84. It will be seen that as the cable 74 moves to the left, as viewed in Fig. 2, the hooked extremity 81$^a$ is moved upwardly to clear the pin 82, and thus permit the truck body to move toward dumping position. Another cable 85 is connected to the crank 79, opposite the cable 74, and is extended downwardly and around a pulley 86 secured to brackets 87 carried by the undersides of the frame members 20. After passing around the pulley 86, the cable 85 extends around another pulley 88 located in a slot in the forward transverse frame member 18$^a$ and journalled on a pin carried by the frame. The cable 85 is then extended in a forward direction and around a small pulley 89 located at the rear end of the truck frame, after which the cable 85 extends forwardly again and is connected to the cross-head 72 on the side thereof opposite the connection of the cable 74. Movement of the cross-head 72 toward the rear end of the truck frame therefore causes the cable 74 to travel in a direction opposite to the travel of the cable 85, so that the cable 74 pulls on the crank arm 79 and lifts the locking lever 81 out of engagement with the pin 82, while the cable 85 is released to permit the upward movement of the lever. After the locking lever 81 has been released, its movement ceases, and further movement of the cable 74 tends to move the truck body to dumping position.

Figure 3:
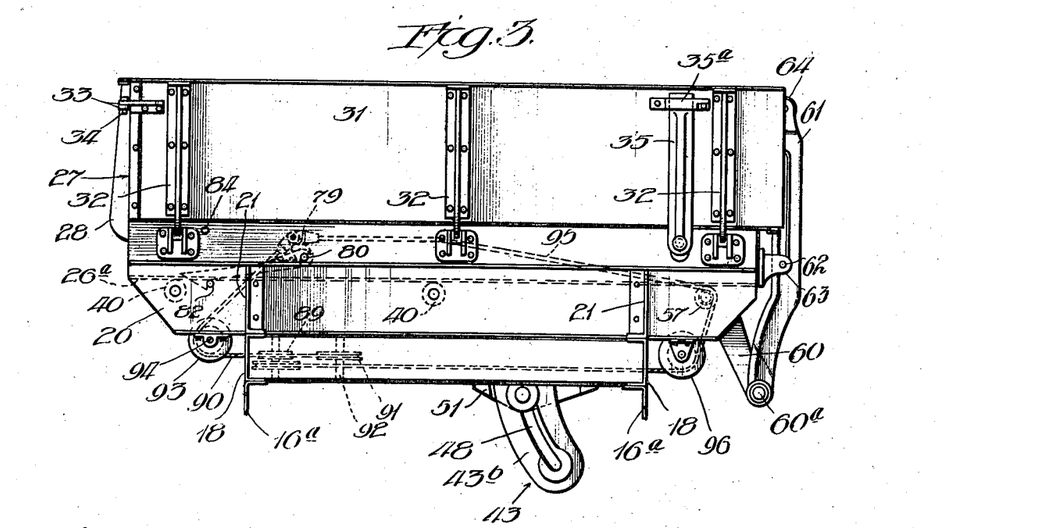
Fig. 3 is a rear elevation of the truck body.

A cable 90 is connected to the cross-head 72 opposite to the cable 74, and is extended therefrom toward the rear end of the frame and around a pulley 91, journalled on a bearing pin 92. After passing around the pulley 91, the cable 90 extends toward the left, as viewed in Fig. 3, and around a pulley 93 carried by brackets 94 secured to the underside of the frame members 20. The cable 90 then extends upwardly and is secured to a crank arm 79 mounted on a pin 80 similar to the construction at the forward end of the car body. Another pin 82 mounted between the members 20 is adapted to engage the hooked extremity 81$^a$ of this lever 81. Another cable 95 is connected to the last-mentioned crank arm 79 opposite the cable 90 and is carried toward the right, as viewed in Figs. 3 and 4, and around one of the pulleys 47 carried at the upper end of the rear controlling arm 43. The cable 90 then extends between the members 26 and around one of the pulleys 57 mounted between the holding devices 56 at the right-hand side of the truck, as viewed in Fig. 4.

From the pulley 57, the cable 90 extends downwardly and around a pulley 96 carried by brackets 97 secured to the members 20, leading therefrom in a horizontal direction, and thence around the pulley 98 located beneath the pulley 89, previously referred to. From the pulley 98, the cable 95 leads to the forward end of the machine and is carried around a pulley 99 located beneath the pulley 88, previously described. After extending around the pulley 99, the cable 95 is carried in a rearward direction again and connected to the cross-head 72 opposite the connection of the cable 85. This construction causes one of the cables 90 or 95 to be released at the same time that a pull is exerted upon the other cable.

When the cross-head 72 moves in a rearward direction, the cables 74 and 95 are actuated to lift up the locking levers 81 and thence move the truck body toward dumping position. When the cross-head 72 is moved in the opposite direction, the cables 85 and 90 are actuated to return the body 15 to its normal position. As it approaches its normal position, the inclined end faces of the locking levers 81 will ride up over the pins 82, and thereby permit the levers to swing into locking position, this movement being permitted by the limited resilience of the operating cables. The movement of the truck body towards its normal position is limited by means of hooked members 100, which are riveted to the upper flanges of the transverse frame members 20 and adapted to engage pins 80 upon which levers 79 are fulcrumed.

Figure 8:
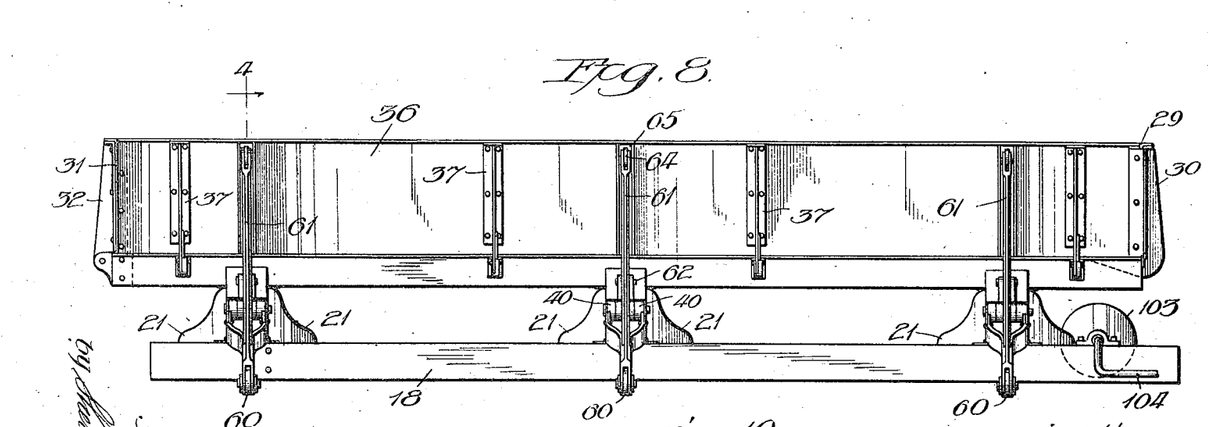
Fig. 8 shows a side elevation of the car body looking toward the left, as viewed in Fig. 3.
Figure 9:
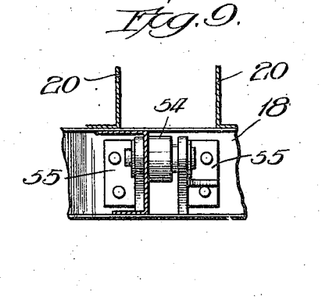
Fig. 9 is a detailed sectional view on the line 9—9 of Fig. 4.
Figure 12:
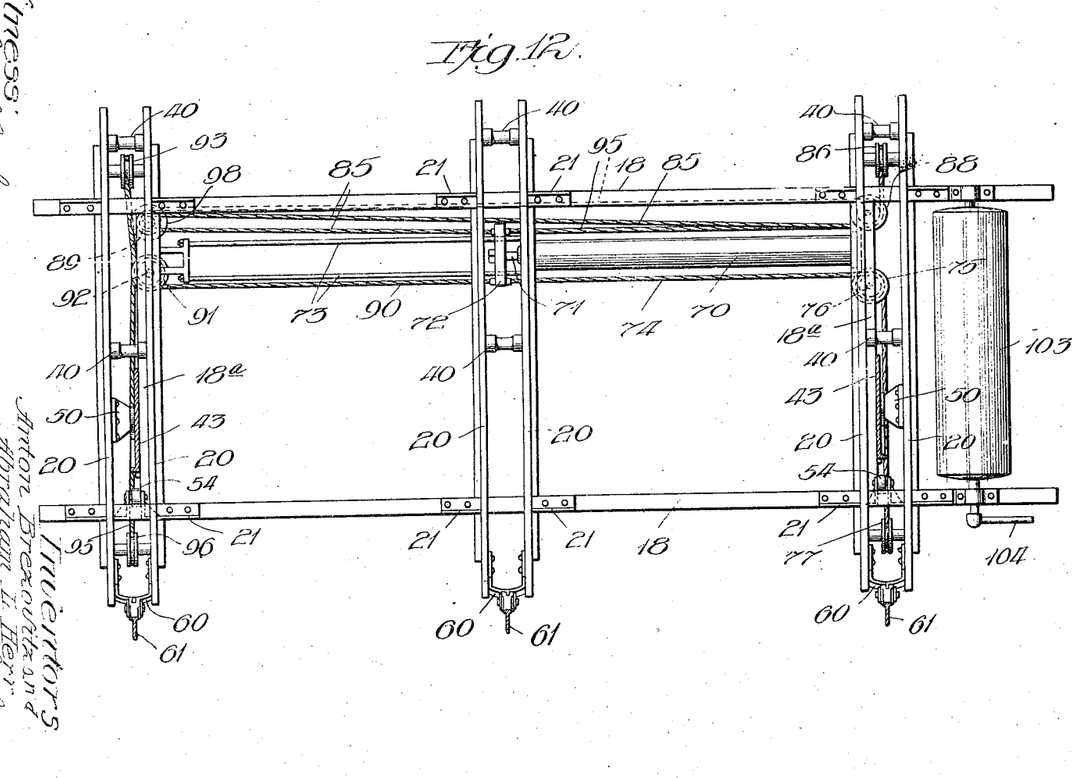
Fig. 12 shows a top plan view of the truck frame illustrating the mechanism for actuating the dumping body.

To operate the cylinder 70, a supply of compressed air, or other fluid, is maintained in a storage tank 103, which is mounted between the auxiliary side frame members 18 under the forward end of the truck body, as shown in Figs. 1, 8, and 12. Compressed air is supplied to the storage tank 103 by a small air compressor, which may be connected by a clutch to the transmission shaft of the truck, when desired, so that the power for dumping the body is supplied directly from the engine of the automobile. An outlet pipe 104 leads from one end of the storage tank 103 forwardly to a four-way valve 105, which is on the dash-board of the truck, as shown in Fig. 1. From this four-way valve, a pipe 106 leads to one end of the cylinder 70, and another pipe 107 leads to the other end of the cylinder. This valve may be operated to cut off the flow of compressed air entirely, or to admit it through the pipes 106 or 107 into either end of the cylinder 70, thereby causing the cross-head 72 to move in either desired direction.

From the foregoing description, it will be seen that the truck body may be dumped by the driver, located on the seat of the truck, by means of power which is supplied by the engine of the car, this power being stored up, if desired, when the truck is not in motion. In dumping the body, it moves in a horizontal direction on the supporting rollers until a considerable portion thereof is projected beyond the side of the truck frame, and the weight of the overlapping portion of the load together with the momentum of the initial movement then operate to assist the power mechanism in causing a tilting of the body upon further movement of the cables. The entire operation of dumping the contents of the body, and of returning the latter to its horizontal position with the side door in its upper closed position may be carried out completely merely by operating the valve 75 located on the dash of the truck.

Although we have shown and described a certain embodiment of the invention for purposes of illustration, it will be understood that it may be constructed in various other forms without departing from the scope of the appended claims.

What we claim is:

1. In combination, a frame, a body movable on said frame, a door hinged on said body, an operating lever pivoted on said frame and extending alongside of said door to maintain the same in closed position, said lever having a sliding connection with said door, and means for moving said body toward said lever with respect to said frame, whereby said door is automatically opened.

2. In combination, a frame, a body mounted on said frame, said body having a hinged side door, a lever connected to said frame and extending upwardly at the outer side of said door, said lever having a longitudinal slot therein, means carried by said body for engaging said slot beneath said door, and means for moving said body toward said lever.

3. In combination, a frame, a body mounted on said frame, said body having a hinged side door, a lever connected to said frame and extending upwardly at the outer side of said door, said lever having a longitudinal slot therein, means carried by said body for engaging said slot beneath said door, means for moving said body toward said lever, and a roller pivoted on the upper end of said lever and adapted to coact with with the outer side of said door.

4. In combination, a frame, a body supported on said frame and having a side wall hinged on the lower edge thereof, a bracket secured to the side of said frame and extending downwardly therefrom, a lever having a sliding connection with said body pivoted on said bracket and extending upwardly alongside of said door, and means for moving said body toward said lever.

5. In combination, a frame, a body supported on said frame, means for moving said body with respect to said frame, a controlling member having a sliding connection with said body and with said frame, and means coacting with said controlling member to limit the movement of said body with respect to said frame.

6. In combination, a frame, a body supported on said frame, said body having a member on the underside thereof provided with a longitudinal slot, a controlling member having a part engaging said slot, said controlling member being provided with a slot, means carried by said frame for engaging the slot in said controlling member, and means for moving said body with respect to said frame.

7. In combination, a frame, a body supported on said frame, said body having a member on the underside thereof provided with a longitudinal slot, a controlling member having a part engaging said slot, said controlling member being provided with a slot, means carried by said frame for engaging the slot in said controlling member, means for moving said body with respect to said frame, and a roller adapted to coact with said controlling member during said movement.

8. In combination, a frame, a body supported on said frame, a member secured to said body and having a longitudinal slot therein, a controlling member having a part engaging said slot, said controlling member being provided with a slot, a pin carried by said frame and engaging the slot of said controlling member, means to move said body horizontally with respect to said frame, and means coacting with said controlling member to effect a tilting of said body after a predetermined horizontal movement thereof.

9. In combination, a frame, a body supported on said frame, a member secured to said body and having a longitudinal slot therein, a controlling member having a part engaging said slot, said controlling member being provided with a slot, a pin carried by said frame and engaging the slot of said controlling member, means to move said body horizontally with respect to said frame, means coacting with said controlling member to effect a tilting of said body after a predetermined horizontal movement thereof, and means for preventing upward movement of said body with respect to said frame at the axis of said tilting movement.

10. In combination, a frame comprising transversely extending supporting members, a body having transverse track members secured to the underside thereof, rollers carried by said supporting members and engaging said track members, means for moving said body on said rollers, said track members having longitudinal slots therein, controlling members mounted adjacent said supporting members, means carried by said controlling members for engaging said slots, said controlling members having curved slots in the lower parts thereof, means carried by said frame for engaging said curved slots, said controlling members being provided with curved surfaces concentric with said slots, and rollers carried by said frame to coact with said curved surfaces.

11. In combination, a frame comprising supporting members arranged in pairs spaced apart, a body, track members secured to the underside of said body and extending downwardly between said pairs of supporting members, rollers mounted between said pairs of supporting members and coacting with the lower edges of said track members, controlling members mounted between said pairs of supporting members, said controlling members having slotted connections with said track members, means for moving said body longitudinally on said supporting members, and means carried by said frame and engaging said controlling members for limiting the movement of said body.

12. In combination, a frame comprising transverse supporting members arranged in pairs spaced apart, a body, complementary pairs of track members secured to the underside of said body, each pair of track members being adapted to enter a space between one of said pairs of supporting members, locking means mounted between said track members, means mounted between said supporting members to be engaged by said locking means, means mounted between said supporting members for supporting said track members, means for moving said track members on said last-named means, and means operated by said moving means for automatically operating said locking means.

13. In combination, a frame comprising transverse supporting members arranged in pairs spaced apart, a body, complementary pairs of track members secured to the underside of said body, each pair of track members being adapted to enter a space between one of said pairs of supporting members, locking means mounted between said track members, means mounted between said supporting members to be engaged by said locking means, means mounted between said supporting members for supporting said track members, means for moving said track members on said last-named means, crank arms for operating said locking means, cable members extending between said track members and connected to said crank arms, means for operating said cables to move said body, and means to limit the movement of said locking means, whereby the initial movement of said cables operate said locking means and the continued movement thereof effects the movement of said body with respect to said frame.

14. In combination, a frame, a body, a locking lever pivoted on said body and having a hooked extremity, a pin carried by said frame to be engaged by said hooked extremity, a crank arm connected to said locking lever, cables connected to and extending in opposite directions from said crank arm, means to operate said cables in either direction to move said body in either direction with respect to said frame, and means to limit the movement of said crank arm upon movement of said cables.

In testimony whereof, we have subscribed our names.

ANTON BREZOVITZ.
ABRAHAM L. HERR.